April 28, 1964 R. C. CORNICK 3,130,514
FISHING RIG
Filed Feb. 11, 1963
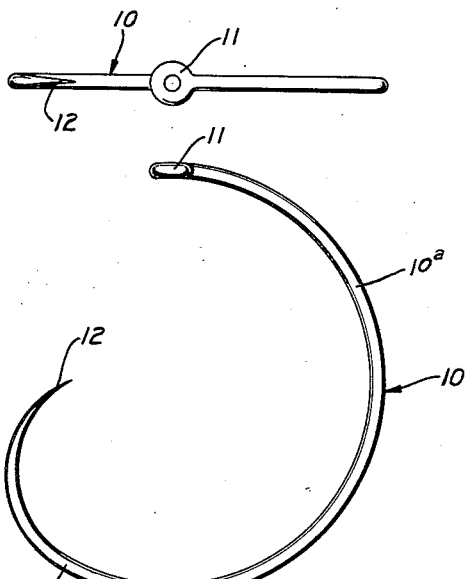
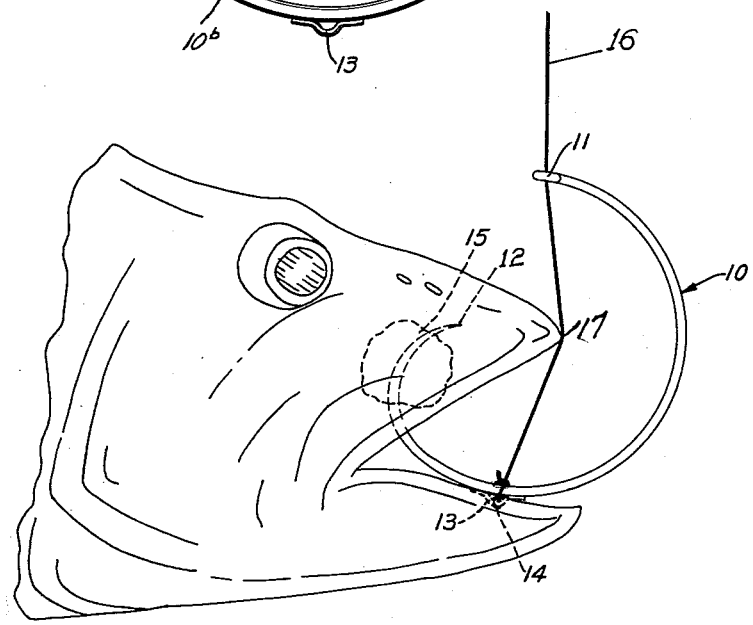
INVENTOR.
ROY C. CORNICK
BY
ATTORNEY

United States Patent Office 3,130,514
Patented Apr. 28, 1964

3,130,514
FISHING RIG
Roy Clifford Cornick, General Delivery, Anderson, Calif.
Filed Feb. 11, 1963, Ser. No. 257,573
2 Claims. (Cl. 43—37)

This invention relates to a fishing rig, i.e., a hook of a given construction and a fishing line attached thereto at certain positions.

In conventional fishing hooks the point of the hook to engage the fish is parallel to the shank of the hook so that a pull on the line when the fish has engaged the baited hook more or less tends to pull the hook from the mouth of the fish unless the fish has swallowed the baited hook.

The principal object of this invention is to provide a hook in combination with the fishing line attached thereto and when the fish attacks the baited hook, the hook, because of its curvature, tends to be caught in the mouth of the fish.

Another object of the invention is to provide a hook in combination with the line attached thereto whereby when the fish attacks the baited hook, the fish engages the line attached to the hook which sets or catches the fish because of the relationship of the shape of the hook and the line which is attached to the hook.

Other objects of the present invention are to provide a fish hook which is of simple construction, has a minimum number of parts, is inexpensive to manufacture and is most efficient for catching fish.

For other objects and a better understanding of the invention, reference should be made to the following detailed description taken in connection with the accompanying drawing, in which:

FIG. 1 is a side elevational view of the preferred embodiment of the present invention showing a fish engaging the baited hook of the invention;

FIG. 2 is a view similar to FIG. 1 but showing the unbaited hook of FIG. 1;

FIG. 3 is a top plan view of the hook shown in FIGS. 1 and 2.

Referring now more in detail to the drawings, 10 represents a curved hook, the complete hook being formed by a curved shank 10$^a$ and a bight 10$^b$. Therefore, as will be seen in FIGS. 1 and 2, the hook is practically circular in form, the curvature of the hook being more abrupt in the length at the bottom of the hook along the bight of the hook.

As seen in FIGS. 1 and 2, the portion of the bight of the hook adjacent pointed end 12 has a more abrupt curvature than that of the remainder of the bight and the shank.

On the bottom of the hook 10 is an eyelet 13 attached on the underside or outside of the hook. The eyelet 13 is vertically below the eyelet 11 at the top of the hook.

The fishing line 16 is threaded through the eyelet 11 at the top of the hook and the end thereof is threaded through the eyelet 13 and attached thereto as at 14. The fishing line 16 is free to run through the eyelet 11.

It will be seen from examining FIG. 1 that when a fish bites or hits the bait 15 on the hook 10, the hook being held by the taut fishing line 16, the upper jaw of the fish engages the line 16 at 17, which, because of the shape of the hook, tends to throw the end of the sharp point 12 of the baited hook upward into the upper jaw of the fish.

While the hook 10 shown here is a barbless hook, the same could well be a barbed hook.

A hook and line attached thereto, as shown in the drawing of this case, are broadly efficient in catching bait fish in that the hook is barbless and does not hurt or mutilate the fish so that the same can be used for live bait.

What I claim as new and desire to protect by Letters Patent of the United States is:

1. The combination of a line and fish hook, said fish hook having a shank curved continuously throughout its length, a line receiving eyelet formed at one end of said shank, a curved bight at the other end of said shank and forming a continuous curve therewith, a pointed end at the free end of said bight, said pointed end being barbless, an eyelet attached on the outside bottom of the bight substantially vertically below the point of the bight and the eyelet formed at the end of the shank, and said fishing line loosely threaded through the eyelet at the top end of the shank, extending across the hook and attached to the hook by means of the eyelet on the bottom of the bight.

2. The structure according to claim 1 in which the portion of the bight of the hook adjacent said pointed end has a more abrupt curvature than that of the remainder of said bight and said shank.

References Cited in the file of this patent

UNITED STATES PATENTS

| | | |
|---|---|---|
| 326,816 | Weatherly | Sept. 22, 1885 |
| 626,777 | Slotterbeck | June 13, 1899 |
| 1,333,148 | Anderson | Mar. 9, 1920 |
| 1,502,781 | Jamison | July 29, 1924 |
| 2,640,291 | Garner | June 2, 1953 |
| 2,782,548 | Linton | Feb. 26, 1957 |
| 2,984,041 | Banker | May 16, 1961 |

FOREIGN PATENTS

| | | |
|---|---|---|
| 23,462 | Great Britain | of 1907 |